(12) United States Patent
Carlson et al.

(10) Patent No.: US 8,565,282 B2
(45) Date of Patent: Oct. 22, 2013

(54) FURNACE DAMPER CONTROL SYSTEM AND METHOD

(75) Inventors: Christopher Carlson, Tuscaloosa, AL (US); David Cole, Mt. Pleasant, SC (US); Kegan Drew, Summerville, SC (US); Christopher Manning, North Easton, MA (US)

(73) Assignee: Nucor Corporation, Charlotte, NC (US)

( * ) Notice: Subject to any disclaimer, the term of this patent is extended or adjusted under 35 U.S.C. 154(b) by 1288 days.

(21) Appl. No.: 12/371,361

(22) Filed: Feb. 13, 2009

(65) Prior Publication Data
US 2010/0208765 A1  Aug. 19, 2010

(51) Int. Cl.
*F27D 17/00* (2006.01)

(52) U.S. Cl.
USPC .................................. 373/9; 373/8

(58) Field of Classification Search
USPC .......... 373/2, 8, 9, 20, 68, 77; 95/20, 23, 280, 95/19; 110/203, 206, 345; 96/20, 244, 96/418; 219/600, 650, 736, 737, 706, 699, 219/420, 494, 663; 432/36, 176
See application file for complete search history.

(56) References Cited

U.S. PATENT DOCUMENTS

| | | | |
|---|---|---|---|
| 2,997,288 A * | 8/1961 | Schwechheimer et al. | 266/83 |
| 4,675,826 A | 6/1987 | Gentry et al. | |
| 4,846,145 A * | 7/1989 | Inouci | 126/208 |
| 5,905,752 A * | 5/1999 | Sieradzki et al. | 373/9 |
| 6,136,068 A * | 10/2000 | Peters | 95/20 |
| 6,245,122 B1 | 6/2001 | Meyers | |
| 6,301,285 B1 | 10/2001 | Sieradzki et al. | |
| 6,372,009 B1 | 4/2002 | Holmes et al. | |
| 6,584,137 B1 | 6/2003 | Dunn et al. | |
| 6,748,004 B2 | 6/2004 | Jepson | |
| 6,890,479 B2 | 5/2005 | Manasek | |
| 6,988,008 B2 | 1/2006 | Hudson et al. | |

FOREIGN PATENT DOCUMENTS

| | | |
|---|---|---|
| KR | 10-2004-0020440 A | 3/2004 |
| KR | 10-0868440 B1 | 11/2008 |

OTHER PUBLICATIONS

International Preliminary Report on Patentability issued on Aug. 16, 2011 for International Application No. PCT/US2010/024063.

* cited by examiner

*Primary Examiner* — Quang T Van
*Assistant Examiner* — Hung D Nguyen
(74) *Attorney, Agent, or Firm* — Moore & Van Allen, PLLC; Jeffrey R. Gray

(57) ABSTRACT

A furnace damper control system and method thereof including a furnace having at least one opening through which electromagnetic radiation from within the furnace may be sensed, an exhaust duct capable of receiving an exhaust gas stream emerging from the furnace, and a controllable damper capable of adjusting the pressure in the exhaust duct. A sensor is capable of sensing electromagnetic radiation through one or more of the openings of the furnace and generating a sensor signal corresponding to the electromagnetic radiation, and a processor is capable of processing the sensor signal and generating a monitoring signal responsive to a parameter of the electromagnetic radiation indicative of furnace emissions. A controller is capable of controlling the damper responsive to the monitoring signal indicative of the furnace emissions.

27 Claims, 7 Drawing Sheets

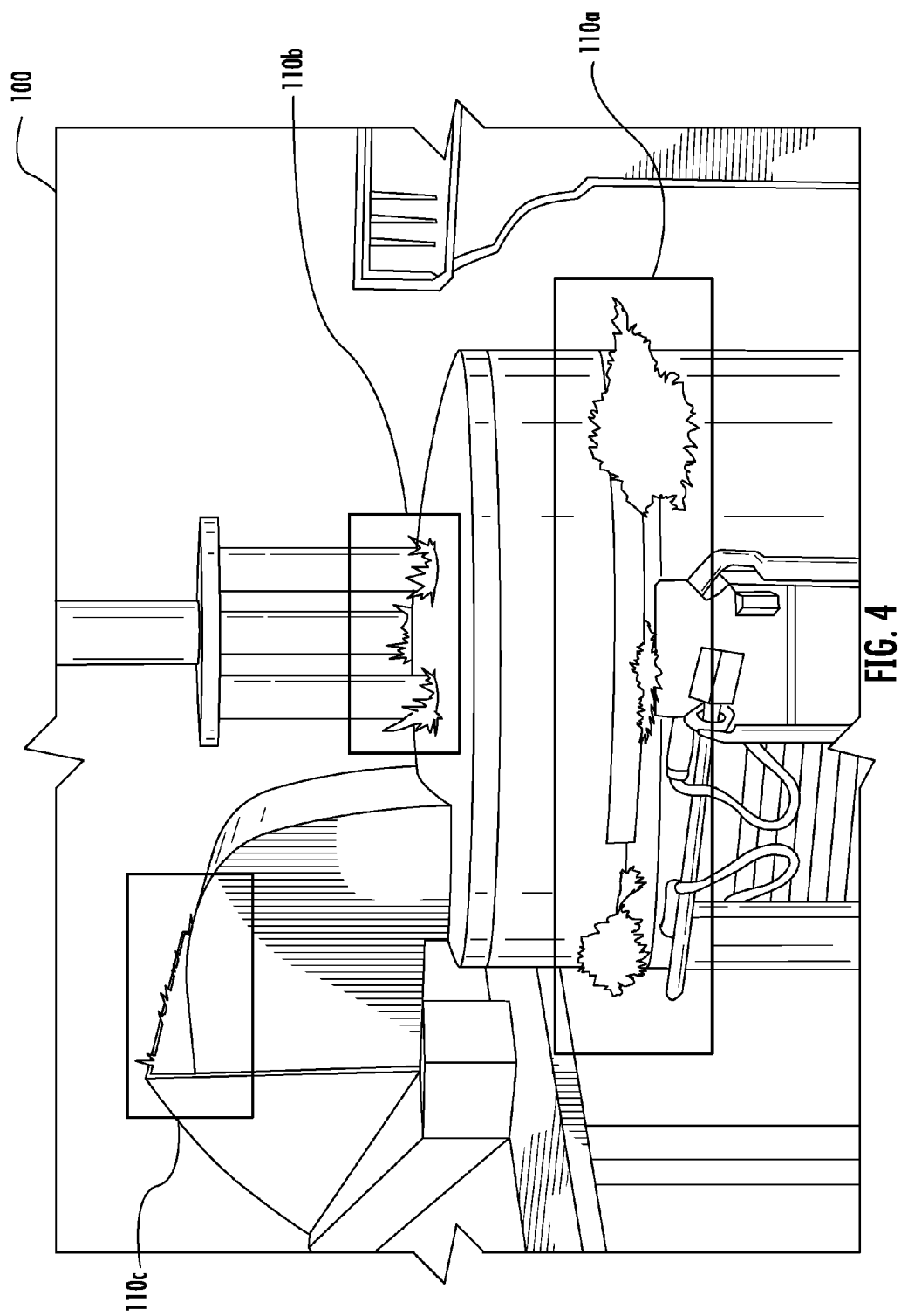

FURNACE DAMPER CONTROL SYSTEM AND METHOD

BACKGROUND AND SUMMARY OF THE DISCLOSURE

The present invention is related to damper control systems, and in particular, systems and methods for controlling exhaust dampers on steelmaking furnaces.

Furnaces, including steelmaking furnaces such as electric arc furnaces for melting steel and other similar products, are typically used in combination with emission recovery systems. Emission recovery systems are needed to capture airborne particulate emissions and exhaust gases created during operation of the furnace.

The exhaust gases created in an electric arc furnace may include certain gases subject to environmental and workplace regulations. For example, gases such as carbon monoxide, sulphur dioxide, and nitrous oxides are frequently produced in the furnace. Volatile organic compounds (VOC) have also been generated during the melt process. Additionally, particulate emissions, such as slag or dust, are produced during the melting process. These exhaust gases and particulate emissions are captured and may be treated in compliance with appropriate regulations.

The volume and composition of furnace exhaust varies significantly during the melting process. The rate at which exhaust gases and particulate emissions are created depends upon many factors, such as the stage of the melting process, the temperature within the furnace, and the amount of air entering the furnace. These same factors also affect the composition of the exhaust gases as the constituent components of exhaust gases are produced or consumed within the furnace.

Another factor affecting the volume and composition of furnace exhaust is the composition of the raw materials being melted. For example, the use of scrap metal as a raw material in steelmaking has resulted in paint and other previously applied coatings, and various impurities being introduced into the furnace. During furnace operation, these impurities melt or burn further contributing to the varied nature of the furnace exhaust. Some furnaces are also equipped to inject carbon and oxygen throughout the melting process resulting in combustion that produces large volumes of gaseous reaction products that add to the exhaust gases. The gaseous reaction products are generated at a variable rate as different sources of carbon are injected into the furnace resulting in fluctuations in the volume of exhaust gases that must be evacuated from the furnace. The evacuation of exhaust gases may regulated and controlled to improve furnace operations.

Typically an emission recovery system includes an induced draft fan and one or more exhaust ducts in communication with an electric arc furnace. The induced draft fan produces a negative pressure that draws furnace exhaust into the exhaust ducts to be collected in a baghouse filter, electrostatic precipitators, or other collection system. Various configurations of exhaust ducts have been developed to improve the overall capture of exhaust gases and particulate emissions. For example, exhaust ducts have been positioned to suction exhaust directly from an opening in or adjacent the roof of the electric arc furnace. Exhaust ducts may also be configured as a canopy or hood over electric arc furnaces.

The induced draft fan causes negative pressure adjacent the fan in the exhaust duct enabling air to be drawn into the furnace, or draft. This air may be heated and combusted within the furnace and exhausted through the exhaust ducts. The exhaust gases may exceed 3000° F. upon exiting the furnace. Excessive negative pressure may cause excessive draft, and excessive draft may cause excessive amounts of air to be drawn into the furnace. Heating and/or combusting this excess air consumes energy resulting in a reduction in furnace efficiency. Further, excess air drawn into the furnace may increase the production of undesirable exhaust gases, such as nitrous oxides. This further reduces the efficiency of furnace operations and increases operating costs. Some undesirable exhaust gases may need to be scrubbed for environmental reasons. Excessive draft also causes temperature control problems and reduces efficiency, and in steelmaking affects slag foaming, slag content, skulling, and other processing parameters.

Conversely, if insufficient negative pressure is applied to the exhaust duct, not enough draft is provided and the desired portion of the exhaust gases and particulate emissions may not be drawn into the exhaust ducts, and may escape through openings in the furnace and bypass the emission recovery system. The escaping exhaust gases and particulate emissions may also cause environmental and workplace concerns. Too little draft may also cause problems related to temperature control in the furnace and excess production of potentially overheated gases. Conversely, if too much draft is applied, furnace efficiency is reduced and operating costs are increased. Thus, a balance in furnace draft control is desirable for efficient use of the furnace.

Efficient operation of a furnace therefore requires regulation of the negative pressure in the exhaust ducts and draft to the furnace. To address these problems, emission recovery systems on steelmaking furnaces have typically utilized dampers capable of adjusting the negative pressure in the exhaust ducts. Previously, exhaust dampers have been set to fixed positions during operation of the furnace. To ensure adequate capture of furnace emissions, the dampers have been set to apply a negative pressure enabling a draft capable of capturing a high volume of exhaust gases produced during operating states of the furnace. Experienced operators have manually adjusted the exhaust dampers during operation to reduce drawing excess air into the furnace. The operators would watch the furnace to detect "puffing," or the escape of excessive exhaust gases or particulate emissions through openings in the furnace. Puffing was typically associated with flames or gases emitting from the openings in the furnace. The operator may manually adjust the damper in response to these observations. This approach required an experienced operator to monitor and adjust the exhaust damper, which may further increase the operating costs of steelmaking.

Some attempts have been made to automate damper control. For example, attempts have been made to measure the negative pressure in the furnace or exhaust ducts directly with a pressure sensor as illustrated in U.S. Pat. No. 6,301,285. In these types of systems, pressure sensors have been mounted in the electric arc furnace roof or in the exhaust duct. The pressure sensors, however, have often become clogged with dust or slag particles from the furnace exhaust. Moreover, the high temperatures within the furnace and exhaust ducts have often damaged or destroyed the sensor rendering the system inoperative and further increasing operating costs of steelmaking. Additionally, the pressure differentials that have been measured are relatively small making precise control of the dampers difficult. Typical environmental fluctuations and changes have also made pressure monitoring less reliable as the desired pressure settings may change over relatively short time periods.

Other attempts to automate emission recovery systems have relied upon measurements of the composition of furnace exhaust gases. For example, U.S. Pat. No. 6,748,004 describes a system that measures the constituents, e.g. COx, of the exhaust gas. U.S. Pat. No. 6,372,009 describes a system that measures the temperature of the exhaust gas and the amount of carbon monoxide at various points in the exhaust gas stream. Sensors in these types of systems have also been susceptible to becoming clogged or damaged by the high temperatures present in the furnace.

Accordingly, there continues to be a need for improved damper control systems that reliably capture furnace emissions while achieving improved energy efficiency and reduced operating costs.

A furnace damper control system is presently disclosed comprising
a) a furnace having at least one opening through which electromagnetic radiation from within the furnace may be sensed, an exhaust duct adapted to receive an exhaust gas stream emerging from the furnace, and a controllable damper adapted to adjust the pressure in the exhaust duct;
b) a sensor adapted to sense electromagnetic radiation emitted through one or more of the openings of the furnace and generate a sensor signal corresponding to the emitted electromagnetic radiation indicative of furnace emissions; and
c) a controller adapted to control the damper responsive to the monitoring signal indicative of the furnace emissions. The parameter of the electromagnetic radiation may be one selected from the group consisting of intensity, wavelength, amplitude, frequency, and combinations thereof.

Alternately, the furnace damper control system may comprise
a) a furnace having at least one opening through which electromagnetic radiation from within the furnace may be sensed, an exhaust duct adapted to receive an exhaust gas stream emerging from the steelmaking furnace, and a controllable damper adapted to adjust the pressure in the exhaust duct;
b) a sensor adapted to sense emitted electromagnetic radiation through one or more of the openings of the furnace and generate digital images thereof;
c) a processor adapted to process the digital images and generate a monitoring signal responsive to a parameter of the digital images indicative of furnace emissions;
d) a controller adapted to control the damper responsive to the monitoring signal indicative of the furnace emissions.

The sensor may be further capable of generating a digital image indicative of at least a part of the visible spectrum. The sensor may be a monochrome sensor or a multi-color sensor. Alternatively or in combination an infrared sensor may be employed.

The processor may be capable of comparing the intensity of pixels in the digital images to a desired reference intensity. The reference intensity may represent intensity in the visible spectrum, infrared spectrum, or both. The reference intensity may be a predetermined value or an adjustable value. The monitoring signal from the processor may correspond to a ratio of pixels of the digital images exceeding the reference intensity. Alternatively or in addition, the monitoring signal may correspond to the number of pixels of the digital images having an intensity exceeding the reference intensity.

The processor may be capable of analyzing all or a part of the color spectra in the visible range of pixels of the digital images and generating a monitoring signal corresponding to the analyzed color of the pixels in the digital images. The monitoring signal may correspond to two or more parameters of pixels of the digital images to provide more accurate control.

The processor may be capable of segmenting the digital images into selected control zones, where each control zone is a portion of the digital images. The control zones may be predetermined portions of the digital images, or the control zones may be determined by the processor. The processor may be capable of processing pixels of the digital images in each control zone. In any case, the control zone may be a physical part of the digital images or selected from different parts of the electromagnetic spectrum.

The controller may comprise one selected from a group consisting of a computer, a programmable logic controller, a proportional integral derivative controller, or a combination thereof. The controller may be capable of generating a control signal corresponding to a desired adjustment of the controllable damper indicated by the monitoring signal. Alternately or in addition, the controller may be capable of comparing the monitoring signal to a set-point. In some embodiments, the controller may be capable of generating at least two control signals corresponding to desired adjustments of at least two dampers.

The furnace damper control system may include an actuator capable of positioning the damper. The actuator may be an electric motor or a pneumatic or hydraulic regulator.

The furnace damper control system may include a pressure sensor capable of generating a pressure monitoring signal.

The controller may be capable of generating a control signal corresponding to a desired adjustment of the damper indicated by the monitoring signal, the pressure monitoring signal, or combinations thereof.

Also disclosed is a method of controlling a furnace damper, the method comprising:
a) sensing electromagnetic radiation emitted through one or more openings of a furnace and generating a sensor signal corresponding to the emitted electromagnetic radiation;
b) processing the sensor signal and generating a monitoring signal responsive to a parameter of the electromagnetic radiation indicative of furnace emissions; and
c) controlling the damper responsive to the monitoring signal indicative of the furnace emissions.

Alternatively, a method of controlling a furnace damper may comprise:
a) sensing electromagnetic radiation emitted through one or more openings of a furnace and generating digital images thereof;
b) processing the digital images and generating a monitoring signal responsive to a parameter of the digital images indicative of furnace emissions; and
c) controlling the damper responsive to the monitoring signal indicative of the furnace emissions.

Also presently disclosed is a furnace comprising:
a) a converter adapted to contain molten metal;
b) an exhaust duct adapted to receive an exhaust gas stream emerging from the furnace;
c) a negative pressure apparatus adapted to draw the exhaust gas stream from the furnace through the exhaust duct;
d) a controllable damper adapted to adjust the pressure in the exhaust duct;
e) at least one opening through which electromagnetic radiation from within the furnace may be sensed;
f) a sensor adapted to sense electromagnetic radiation emitted through one or more of the openings of the furnace and generate digital images thereof;
g) a processor adapted to process the digital images and generate a monitoring signal responsive to a parameter of the digital images indicative of furnace emissions; and
h) a controller adapted to control the damper responsive to the monitoring signal indicative of the furnace emissions.

A method of making steel is also disclosed comprising:
a) charging a furnace with raw material;
b) operating the furnace to melt the steel;

c) sensing electromagnetic radiation emitted through one or more openings of the furnace and generating digital images thereof;

d) processing the digital images and generating a monitoring signal responsive to a parameter of the digital images indicative of furnace emissions; and e) controlling the damper responsive to the monitoring signal indicative of the furnace emissions.

BRIEF DESCRIPTION OF THE DRAWINGS

Presently contemplated embodiments of the damper control system are described below by reference to the following figures:

FIG. 4 is a captured image of an electric arc furnace with three control zones;

DETAILED DESCRIPTION OF THE DRAWINGS

Figure 1:
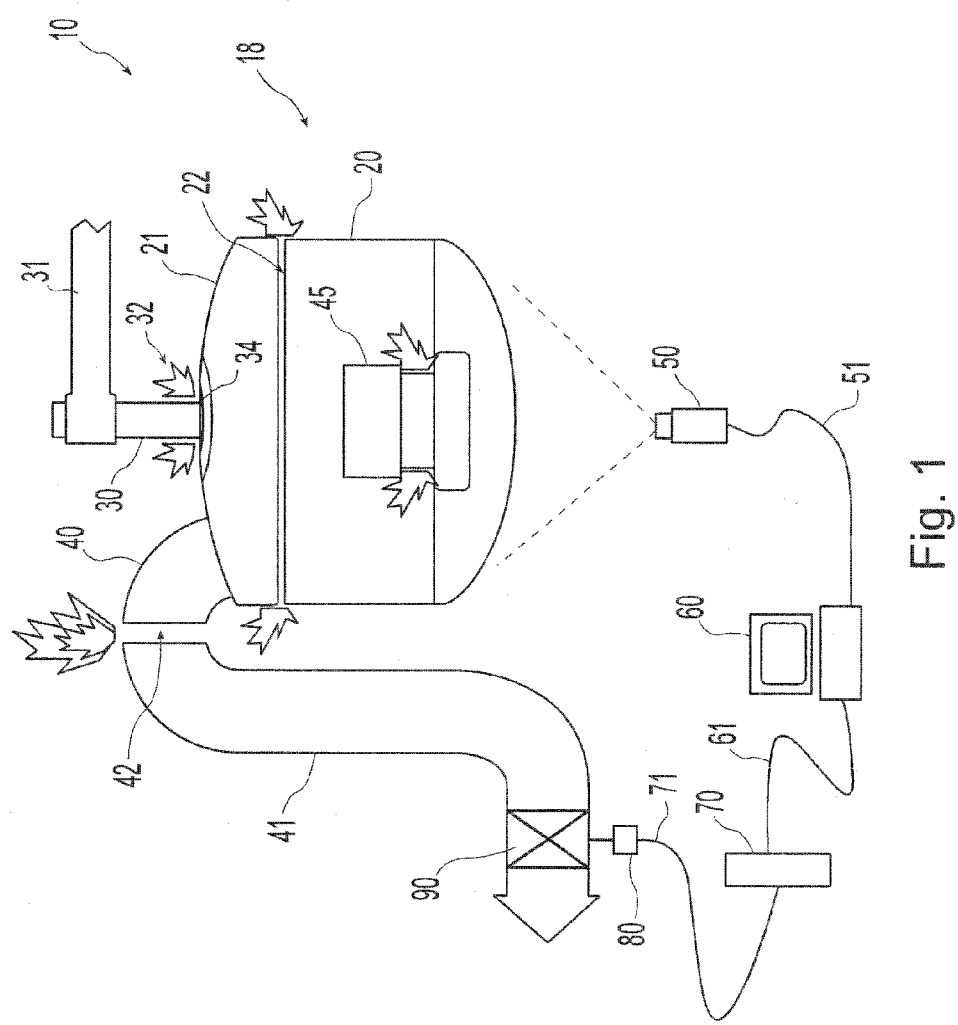
FIG. 1 is a schematic view of an electric arc furnace damper control system.

Referring generally to FIGS. 1 through 8, a furnace damper control system 10 is disclosed for a furnace, such as an electric arc furnace, basic oxygen furnace, or other steelmaking furnace. The damper control system 10 may control the damper to adjust the pressure in the exhaust duct 41 to maintain flow in the exhaust duct to evacuate exhaust gases and furnace emissions, such as dust, flame, and gaseous combustion or reaction products, The furnace damper control system 10 may be used in other high temperature furnace systems employing exhaust ducts such as incinerators. As shown in FIG. 1, the system 10 may comprise a furnace, e.g. an electric arc furnace, having at least one opening through which electromagnetic radiation from heat within the furnace may be viewed, an exhaust duct 41 capable of receiving an exhaust gas stream emerging from the furnace, and a controllable damper 90 capable of adjusting the pressure in the exhaust duct 41. The furnace damper control system 10 also comprises a sensor 50 capable of sensing electromagnetic radiation emitted from the furnace through one or more of the openings, a processor 60, an actuator 80 capable of positioning the damper 90, and a controller 70 capable of controlling the damper responsive to the sensed electromagnetic radiation.

Figure 2:
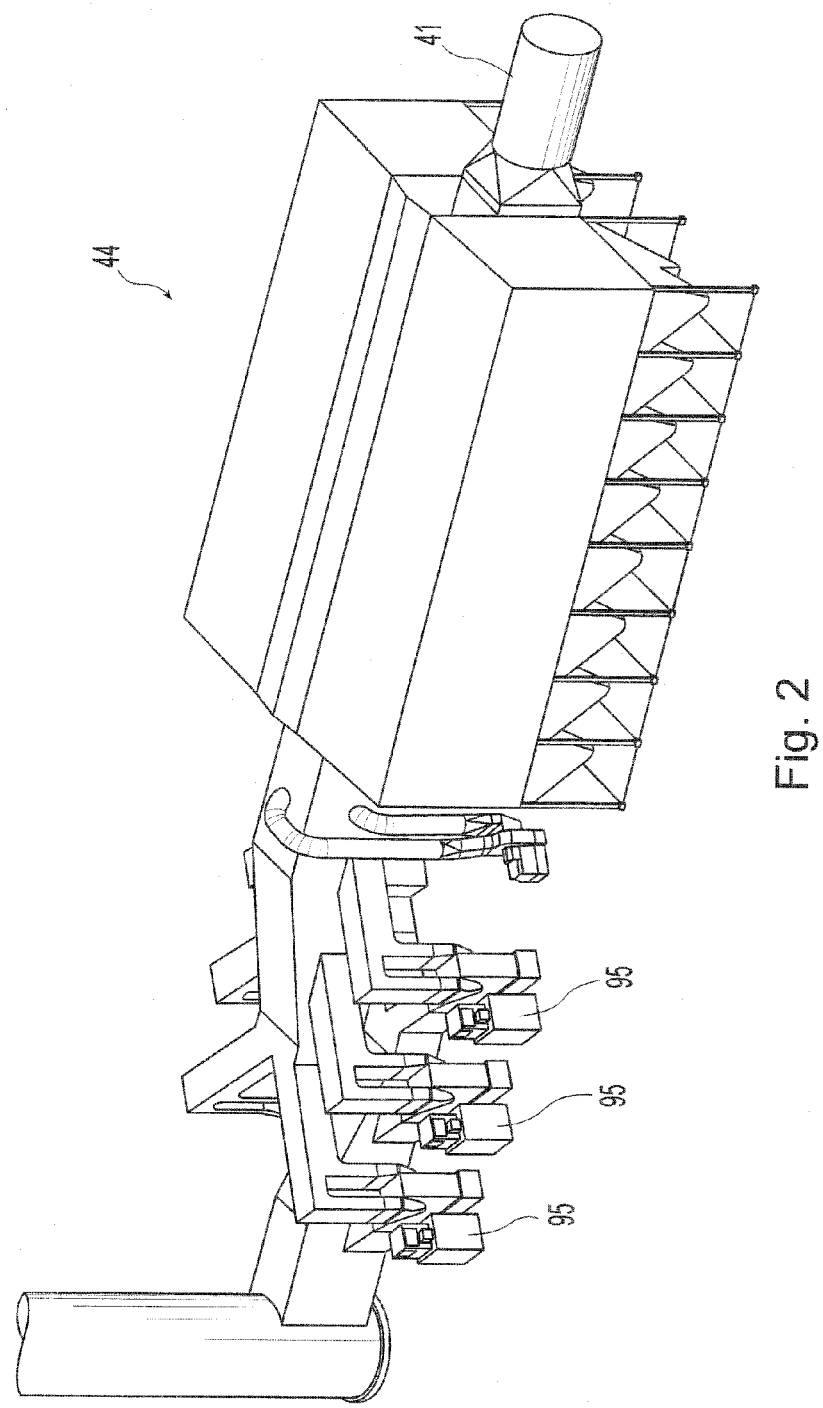
FIG. 2 is a diagrammatical perspective view of a baghouse.

The damper control system 10 includes a negative pressure apparatus, such as one or more induced draft fans 95. The induced draft fans 95 may be draft fans for a baghouse system 44 or emission collection system as shown in FIG. 2. The induced draft fan 95 is positioned to create a negative pressure within the exhaust duct 41 and draw exhaust gases from the furnace into the exhaust duct 41, enabling a draft through the furnace. The controllable damper 90 is positioned to control the pressure in the exhaust duct 41. The controllable damper 90 may be capable of adjusting the pressure at the exhaust duct 41 to control the gas flow rate through the damper 90 and exhaust duct 41. The actuator 80 is positioned capable of adjusting the damper to control the gas flow rate through the damper 90 as desired.

A steelmaking furnace such as an electric arc furnace 18 may have one or more openings through which electromagnetic radiation may be sensed. As shown in FIG. 1, an electric arc furnace 18 may have a furnace converter 20 with a furnace roof 21. The furnace 18 may have an opening referred to as the furnace-roof opening 22. The electric arc furnace 18 may also have at least one and typically three electrodes 30 and electrode holders 31, as desired for the size and heat capacity of the furnace. The electrode 30 enters the furnace through electrode port 34, which may provide for an opening between the electrode and the edge of the electrode port 34 referred to as the electrode opening 32. The furnace may also have an exhaust port 40 through which exhaust gases exit the furnace. The electric arc furnace damper control system 10 may also have an exhaust duct 41 positioned to receive the exhaust gas stream emerging from the exhaust port 40 of the electric arc furnace. An opening or gap between the exhaust port 40 and the exhaust duct 41 may be referred to as the exhaust port opening 42. The steelmaking furnace typically may have a slag door 45 in the furnace 18. The slag door 45 may further provide an opening through which electromagnetic radiation may be viewed. Alternately or in addition, exhaust gases may be captured through a canopy duct, not shown, which may be positioned over the electric arc furnace. The overall structure and operation of an electric arc furnace is further described in U.S. Pat. No. 6,584,137, the disclosure of which is incorporated herein by reference for purpose of best mode. Reference may be made to U.S. Pat. No. 6,584,137 for appropriate construction and operational details but forms no part of the present invention.

During operation, the furnace roof 21 may be removed and a charge of raw material, such as scrap metal and other iron sources, introduced into the furnace 18. In the electric arc furnace 18, the electrode 30 is used to generate heat and temperature to melt the raw material, typically resulting in exhaust gases and particulate emissions being generated within the furnace. These exhaust gases and particulate emissions may exit the furnace through the exhaust port 40. The exhaust gases and particulate emissions may also escape from the furnace through the furnace-roof opening 22, and the openings around the electrodes and the exhaust port.

Also during operation, electromagnetic radiation may be emitted through the furnace-roof opening 22, electrode opening 32, exhaust port opening 42, or other openings in the electric arc furnace. The emitted electromagnetic radiation may be visible light from flames. The flames from within the furnace may extend a distance through the furnace-roof opening 22, the electrode opening 32, and the exhaust port opening 42. The nature of the electromagnetic radiation emitted through these openings correlates with the amount of exhaust gases or particulate emissions escaping from the furnace. Further, we have found that the amount of emission and the distance the flame extends through the openings can be correlated with the pressure inside the exhaust duct 41 and the electric arc furnace 18. Electromagnetic radiation emissions through the openings indicate the need to adjust the controllable damper 90 to increase or decrease the operating efficiency of the furnace. Electromagnetic radiation other than visible light, such as infrared radiation, may be observable through the openings of the furnace with an appropriate sensor.

By detecting electromagnetic radiation through one or more of the openings of the electric arc furnace, the sensor 50 may be used to monitor the emissions from the furnace. For example, electromagnetic radiation from excessive flame and heat emitting from the furnace-roof opening 22, the electrode opening 32, and/or the exhaust port opening 42 may indicate excessive pressure in the furnace 18. The furnace damper control system 10 may use the electromagnetic radiation sensed from these openings to automatically control the damper 90 to regulate the negative pressure applied to the exhaust duct and the draft to the furnace. This automatic adjustment may be used to control the flow through the exhaust duct to maintain an effective draft resulting in furnace emissions being captured while improving the operating efficiency of the furnace.

The sensor 50 may be capable of sensing electromagnetic radiation and generating a sensor signal 51 corresponding to the electromagnetic radiation. The sensor signal 51 may correspond to one or more parameters of the electromagnetic radiation such as wavelength, frequency, amplitude, intensity or brightness, or other measured parameters. Sensor 50 may include a wavelength sensor, visible brightness sensor, infrared temperature sensor, or other sensor capable of sensing desired parameters of the electromagnetic radiation.

Figure 3:
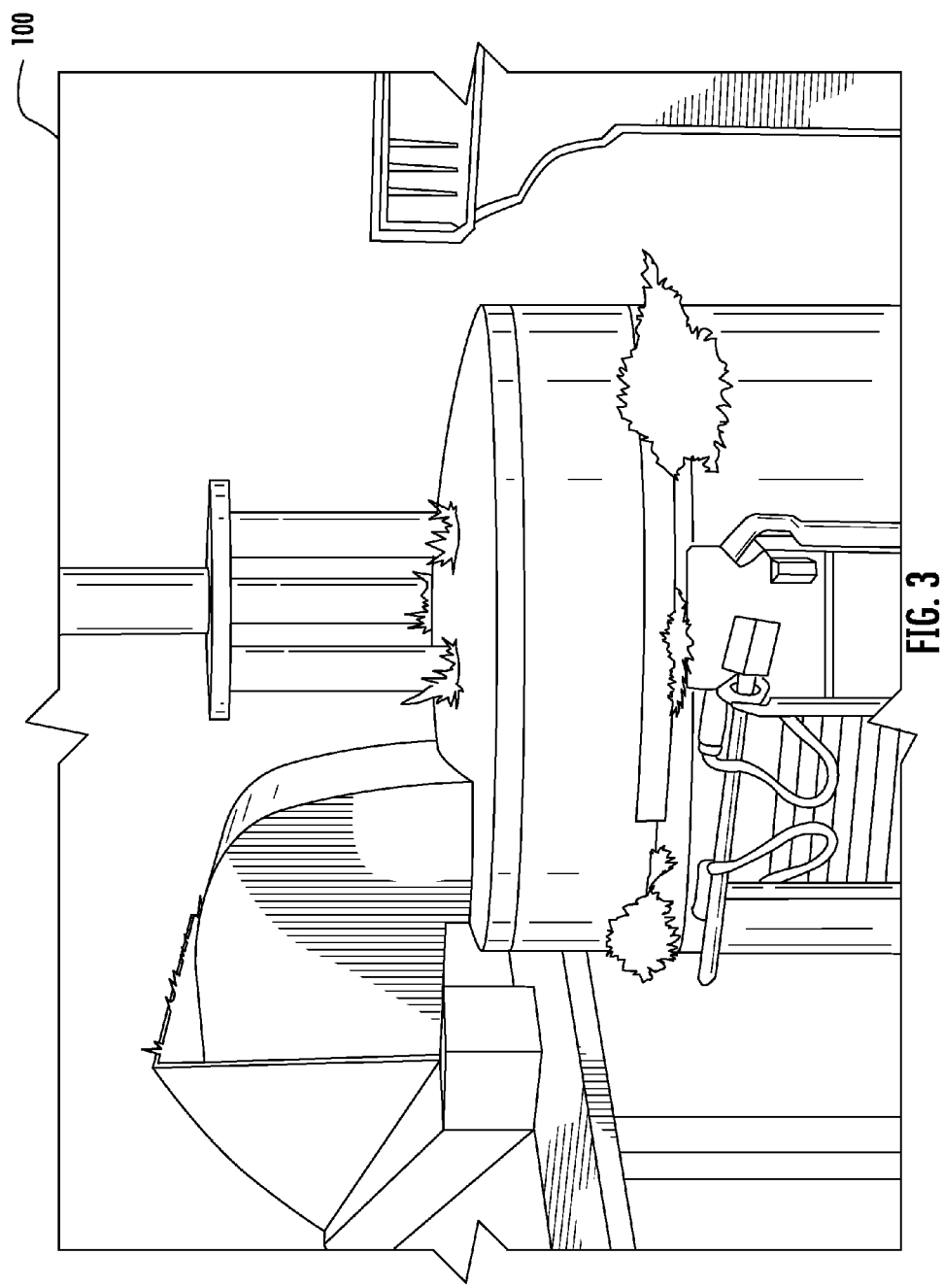
FIG. 3 is a captured image of an electric arc furnace.

Alternately or in addition, the sensor 50 may be capable of sensing the electromagnetic radiation emitted through the openings of the furnace and generating a sensor signal 51 comprising digital images indicative of the sensed electromagnetic radiation. The captured image produced by the sensor may be a monochrome image, such as a gray-scale image. A sample monochrome captured image 100 is shown in FIG. 3. Alternatively, the captured image may be a multi-colored image or an infrared image. In another alternative, the captured image may contain representations of all or portions of the visible spectrum and/or the infrared spectrum. In a configuration generating digital images, the sensor 50 may be an integrated component such as a thermal imaging or infrared camera, or may consist of discrete components such as an image sensor capable of sensing the desired electromagnetic radiation and a component capable of capturing and transmitting digital images from the image sensor, such as a frame grabber.

The nature of the operating environment may influence the selection of the sensor 50 for a given application. Protection systems may be employed to guard the sensor against damage in a high temperature environment. In a steel mill, for example, the sensor may be exposed to high temperatures near a steelmaking furnace (e.g. about 2600° to 3000° F.); therefore, a sensor suitable for such high temperature use or a cooling system may be used.

The processor 60 communicates with the sensor 50 and may receive the sensor signal 51 through any conventional means, such as wired or wireless connections. The processor 60 is capable of receiving and processing the sensor signal 51 and generating a monitoring signal responsive to a desired parameter of emitted and monitored electromagnetic radiation indicative of furnace emissions. The furnace emissions may be correlated with the pressure or temperature in the furnace, and the monitoring signal may also be responsive to a desired parameter of emitted and monitored electromagnetic radiation. The monitoring signal may be responsive to a desired parameter of the sensor signal 51 indicative of the furnace emission, pressure, or other operating parameters in the furnace. For example, the processor 60 may receive a sensor signal corresponding to the intensity or brightness of the electromagnetic radiation. We have found that the brightness or intensity of the electromagnetic radiation can be empirically correlated to a difference between the pressure inside the furnace and the ambient atmospheric pressure. The intensity may, for example, correspond to brightness in the visual spectrum or to temperature in the infrared spectrum. The processor generates a monitoring signal responsive to the sensor signal 51 receivable by the controller 70 for controlling the damper 90. In one example, the processor 60 may compare the sensed intensity of the electromagnetic radiation to a reference intensity, discussed below. In this embodiment, the processor 60 may generate a monitoring signal and the controller 70, which may generate a control signal, may control the damper to maintain the reference parameter monitored. Wavelength, frequency, amplitude, intensity, or other measures of electromagnetic radiation are contemplated for use in generating the monitoring signal in the damper control system. The monitoring signal may be indicative of furnace emissions, and indirectly pressure or temperature in the furnace, and may determine the sensor 50 for the given application.

Alternately or in addition, the processor 60 may be an image processor capable of receiving a sensor signal 51 comprising captured digital images from the sensor 50. When the sensor signal 51 comprises digital images, the captured digital image received by the image processor may comprise pixels, each pixel representing a portion of the captured image. The image processor may be capable of processing the pixels of the captured images and generating a monitoring signal 61 corresponding to a parameter of the pixels of the captured image. The image processor 60 may also be capable of filtering or altering the captured digital image. Such filtering or alteration may be performed either before or during processing of the captured image. Filtering the captured image may improve the stability of the damper control system. Also, filtering may be able to increase the contrast between pixels representing furnace emissions, such as flames, and pixels that do not represent furnace emissions.

When the sensor signal 51 comprises digital images, the processor 60 may process the pixels of the captured digital images in numerous ways. In one example, the image processor may compare the intensity of all or part of the pixels of the captured digital image to a reference intensity. The intensity of a pixel may, for example, correspond to brightness in visual spectrum or to temperature in the infrared spectrum. The processor 60 may generate the monitoring signal responsive to the difference between pixel intensity and the reference intensity. Other measures of intensity or similar characteristics that can be determined from the captured digital images are contemplated for use in the damper control system, depending upon the capabilities of the sensor selected for a given application.

Numerous processors capable of receiving the sensor signal 51 and generating a monitoring signal are known to those of ordinary skill in the art. For example, the processor 60 may be a personal computer, microprocessor, or dedicated digital signal processor programmed for receiving a sensor signal 51 corresponding to the electromagnetic radiation. The processor 60 may be an image processor including commercially available image processing software, or custom or semi-custom software. One such commercially available software package for image processing is National Instruments Machine Vision®.

The sensor 50 or processor 60 may also be capable of altering the sensor signal 51 before processing by the processor 60. For example, the sensor 50 or processor 60 may be capable of filtering and/or compressing the signal. When the sensor signal 51 comprises digital images, the sensor 50 or processor 60 may be capable of cropping or compressing the captured digital image. Cropping may entail excluding portions of the captured image to reduce the size of the captured image transmitted to the image processor. Numerous techniques are well known for image compression and may be employed. Applying these or other alterations are not required, but may improve the speed of transmission and responsiveness of the damper control system.

The processor 60 may compare the sensed electromagnetic radiation to a reference intensity. The reference intensity may be a predetermined value that has been correlated with flame being emitted through an opening of the electric arc furnace. As shown in the captured images of FIGS. 3 and 4, the image may have portions that have relative brightness, corresponding to visible flame escaping from the furnace. The reference intensity of the electromagnetic radiation may be selected to identify the pixels that represent the emitted flame. In one example, pixels having an intensity of approximately 95% of the maximum intensity, i.e. 95% of full scale, were identified as correlated with visible flame and excessive furnace emissions.

Alternatively, the reference intensity of the electromagnetic radiation may be an adjustable value. The reference intensity may be selected by an operator in response to observed operating performance of the furnace, or the reference intensity may be dynamically determined by the processor 60. For example, the reference value of the electromagnetic radiation may be adjusted based upon historical data collected by the processing software of the damper control system. The processor 60 may be capable of automatically calibrating the reference intensity or setting the reference intensity when instructed by an operator. A calibration of the sensor 50 and the processor 60 may be useful when the damper control system is used in an environment with other sources of electromagnetic radiation that may affect the sensed electromagnetic radiation representing furnace emissions, such as smoke or other variables.

In one configuration, after comparing each pixel to the selected reference intensity, the image processor 60 may calculate the percentage of pixels in the captured image that exceed the reference intensity of the electromagnetic radiation. The calculated percentage may be the parameter used to generate the monitoring signal 61 by the processor 60. For example, the monitoring signal 61 may be set to the calculated percentage in the range of 0% to 100%. In another alterative, the processor 60 may calculate the total number of pixels that exceed the reference intensity of the electromagnetic radiation. The calculated total number may then be the parameter used to generate the monitoring signal 61. Other parameters calculated from the pixels of the captured image may be used, and standard signal conditioning techniques may be used to scale or adjust the monitoring signal.

Variations on the previous example have been contemplated for use with the automated damper control system. For example, multiple reference intensity levels may be utilized to discriminate between different levels of furnace emissions. Identifying multiple emission levels of electromagnetic radiation may enable the processor 60 to more accurately characterize the level of furnace emissions and produce a more responsive monitoring signal 61. In another example, the sensor 50 may generate a multi-color digital image. The processor 60 may analyze all or a part of the color spectrum of the pixels in the capture image to determine the character of furnace emissions. In yet another example, the processor 60 may identify the smoke or clouds of particulate emissions escaping from the furnace. In these examples, the processor 60 would generate a monitoring signal 61 corresponding to a parameter representing the identified electromagnetic radiation corresponding to such emissions from the furnace.

In yet another example, the processor 60 may calculate a parameter based on a weighed count or average of pixels in a captured image. The processor 60 may use a weighting function representing the relative contribution of each pixel to the total furnace emissions. In such an embodiment, a smaller number of intense, heavily-weighed pixels may warrant a different damper control than a larger number of less intense pixels.

In another image processing embodiment, the captured digital image 100 may be segmented into selected control zones corresponding to portions of the captured image representing the openings of the steelmaking furnace through which electromagnetic radiation may be sensed. For example, control zones may be established at locations where a high percentage of furnace emissions frequently occur. As shown in FIG. 4, control zone 110a corresponds to the furnace-roof opening 22, control zone 110b corresponds to the electrode opening 32, and control zone 110c corresponds to the exhaust port opening 42. The processor 60 may perform image processing only within the control zones to reduce the amount of processing.

The control zones may be predetermined portions of the captured digital image. Alternatively, the processor 60 may be capable of dynamically identifying the control zones based upon reference points in the captured image of electromagnetic radiation. Such dynamic identification of control zones may improve the reliability of the damper control system by automatically correcting for inadvertent misalignments of the sensor 50 relative to the monitored openings of the furnace. The processor 60 may also be capable of generating an alarm signal if the sensor is displaced to such an extent that the control zones no longer adequately represent the captured image.

One benefit of utilizing control zones is that extraneous data from other portions of the captured image is effectively filtered. The monitoring signal 61 produced by the image processor 60 may thus be a more accurate reflection of the emission observed at the openings of the furnace.

Damper control systems utilizing control zones may also generate multiple monitoring signals, each corresponding to parameters of pixels of the captured digital image in one or more of the control zones. The multiple monitoring signals may then be used, either separately or in combination, to determine the desired adjustment of one or more controllable dampers 90. In an electric arc furnace employing multiple dampers, the relationship between each damper and each control zone may be determined and incorporated into the control system thereby reducing emissions while further improving efficiency of the furnace.

Additionally, the image processor may apply a different reference intensity for each control zone. Using different references may be desired to compensate for differences in the environment between the sensor and each of the openings of the furnace corresponding to the control zones. Alternatively, different references may be desired when the design of the exhaust ducts permit different openings to have different observed emission levels.

The controller 70 may be capable of generating a control signal 71 corresponding to a desired adjustment of the damper 90 responsive to the monitoring signal. The controller 70 may also be capable of generating a control signal corresponding to a desired adjustment of the induced draft fan 95. The control 70 may comprise a computer, a programmable logic controller, or equivalent device. In one example, the controller 70 may be a proportional integral derivative (PID) controller. PID controllers are well known in the art. The PID controller may provide rapid control of the damper 90 when the monitoring signal 61 indicates excessive furnace emissions, and may provide a smaller control of the damper when the monitoring signal 61 indicates the furnace is operating efficiently. Additionally, a controller may be selected or implemented to achieve stability in the resulting system to avoid oscillation in the damper adjustment.

The controller 70 may process the monitoring signal in numerous ways. For example, the controller may be capable of comparing the monitoring signal to a set-point. The set-point may represent a level of electromagnetic radiation, such as visible flame, that has previously been determined to correlate with efficient operation of the furnace, while ensuring that furnace emissions are adequately captured by the emission recovery system. Further, the set-point may be adjustable by an operator. In another example, the controller 70 may be capable of generating two or more control signals corresponding to desired adjustments of at least two dampers. Multiple control signals may be used if a single controller is serving multiple furnaces each having its own damper. Multiple control signals may also be used if a single furnace utilizes two or more controllable dampers to regulate negative pressure in the exhaust ducts and the flow of exhaust gases through the exhaust ducts.

Figure 5A:
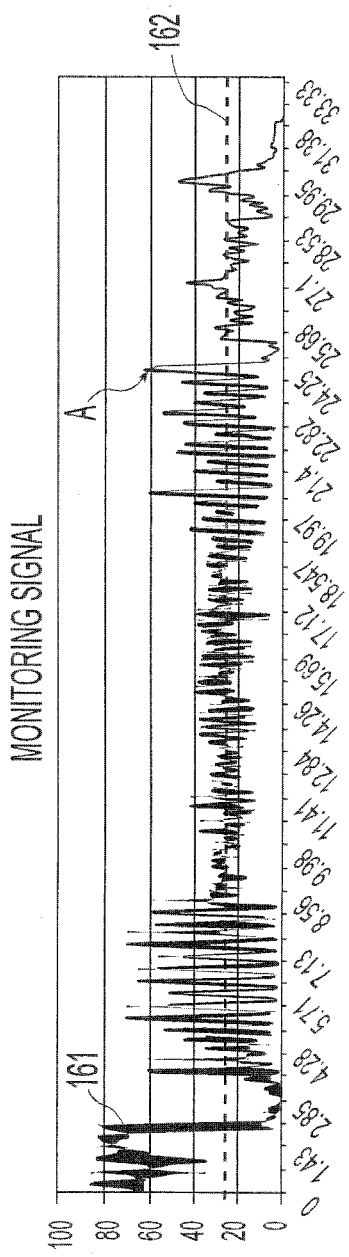
FIG. 5A is a graph of a monitoring signal.
Figure 5B:
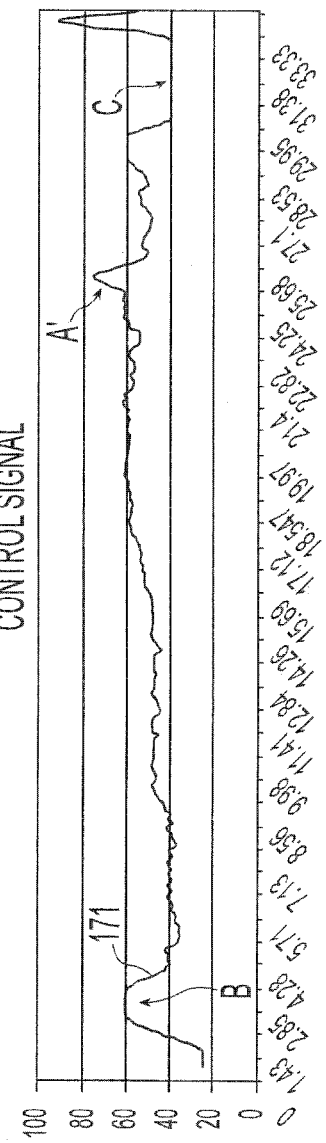
FIG. 5B is a graph of a control signal.

A sample monitoring signal 161 and control signal 171 are illustrated in FIGS. 5A and 5B. The monitoring signal 161 is shown in FIG. 5A. In this example, three control zones were used and the percentage of pixels in each control zone that exceeded a reference value was calculated. The monitoring signal 161 was set to the maximum percentage calculated among the three control zones. As the graph illustrates, the monitoring signal 161 fluctuates as the measured intensity of furnace emissions changes. During furnace operations, the monitoring signal 161 was compared to a pre-established set-point value 162, also illustrated in FIG. 5A; and a control signal 171, shown in FIG. 5B, was generated by the controller. The monitoring signal 161 and control signal 171 are each shown over the same duration on the same time scale. As depicted at Reference A, when the monitoring signal 161 exceeded the set-point value 162 indicating increased furnace emissions, the control signal 171 increased, depicted at Reference A', causing the controllable damper to open increasing the negative pressure applied to the furnace and the flow in the exhaust duct so that emissions are drawn back into the exhaust duct. Over time, the monitoring signal 161 can be seen to fluctuate around the predetermined value of the set-point 162 as the controller makes adjustments to the damper position to ensure emissions are captured without over drafting the furnace. Also shown in FIG. 5B are References B and C which are predetermined damper settings applied for specific furnace operations, such as charging raw material or tapping or trimming of the furnace. This illustrates an implementation of the automated damper control system combined with predetermined fixed damper settings.

Actuator 80 may be capable of adjusting the position of the damper 90 in response to the control signal 71. The actuator 80 may be an electric motor, a controllable servo, a pneumatic regulator, a hydraulic regulator, or any similar device. Numerous actuators are well known in the art and the actuator 80 may be integrated with the controllable damper 90. Additionally, actuator 80 may be capable of controlling the induced draft fan 95 to further regulate the negative pressure in the exhaust duct 41 and the flow of furnace exhaust through the exhaust duct.

Figure 6:
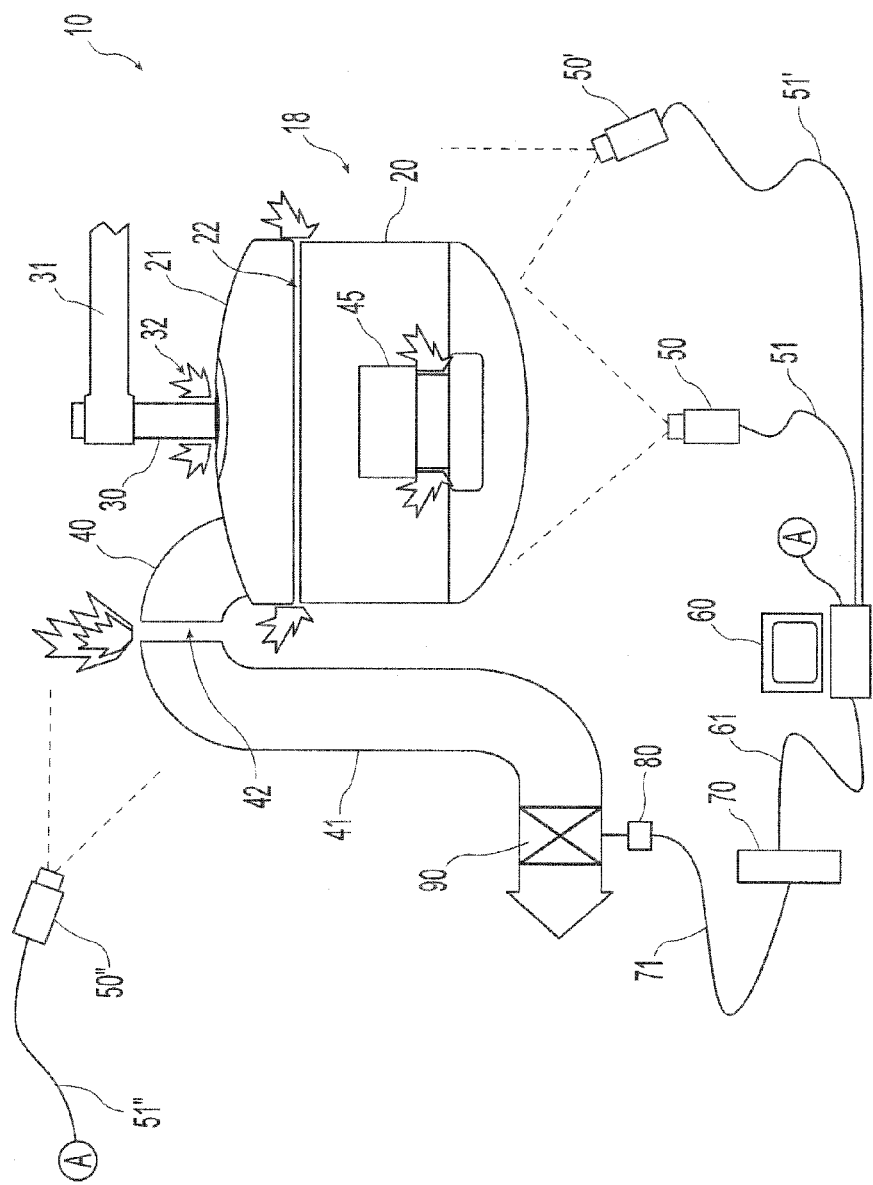
FIG. 6 is a schematic view of another electric arc furnace damper control system.

Other embodiments of the electric arc furnace damper control system are also contemplated. For example, multiple sensors may be employed with a single electric arc furnace. As shown in FIG. 6, multiple sensors 50, 50', 50" may be provided, each sensor monitoring one or more of the openings through which electromagnetic radiation may be viewed. The sensor signals 51, 51', 51" generated by the multiple sensors may be transmitted to a single processor 60. The processor 60 may treat the sensor signals 51, 51', 51" provided by each sensor as a separate control zone, or may combine two or more sensor signals 51, 51', 51" for the purpose of processing.

Figure 7:
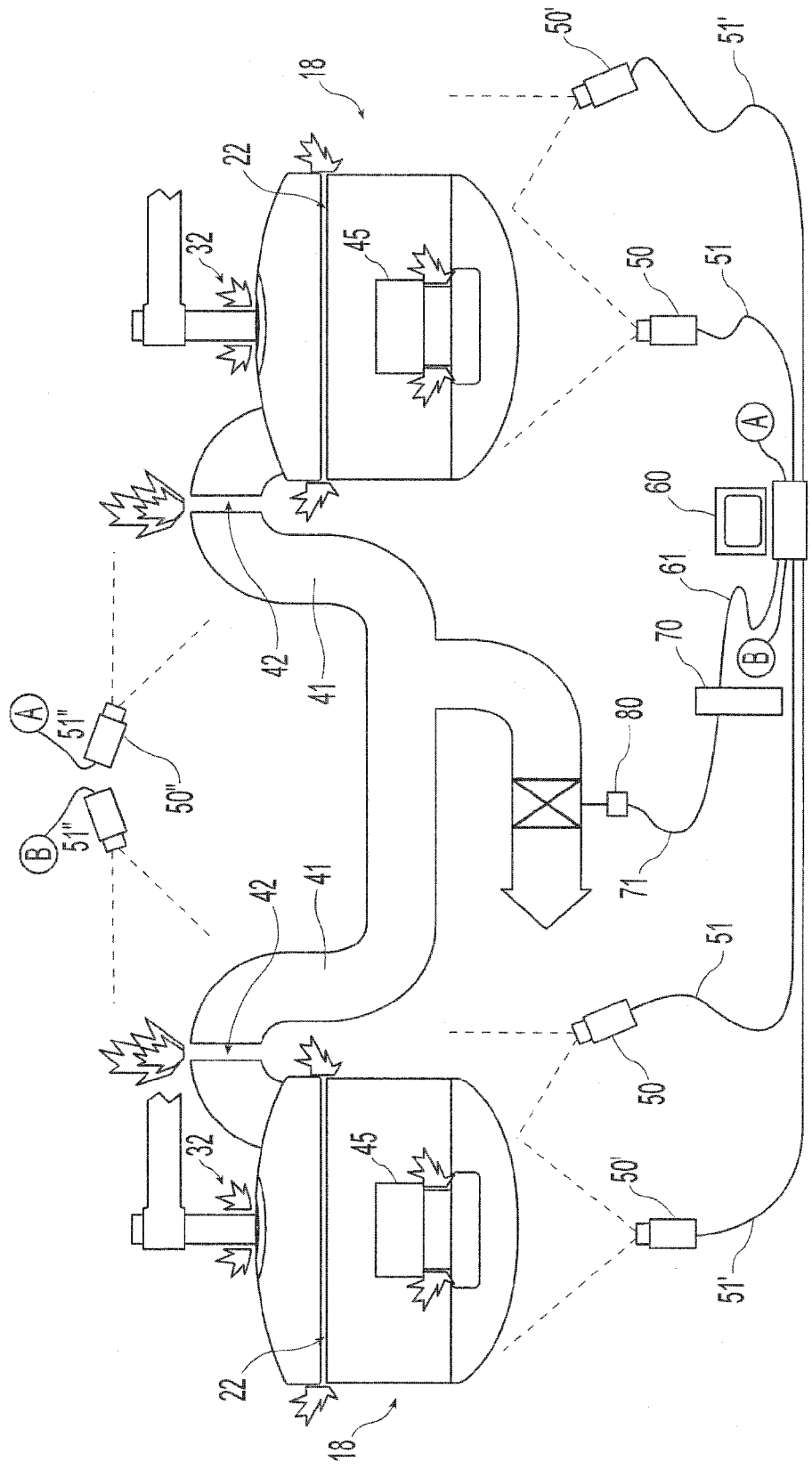
FIG. 7 is a schematic view of yet another electric arc furnace damper control system.

Alternatively, a single electric arc furnace damper control system may be employed with multiple electric arc furnaces. Multiple electric arc furnaces may share a common exhaust duct 41 and controllable damper 90. As shown in FIG. 7, a damper control system for multiple electric arc furnaces may share a common processor 60, and may share a common controller 70. One or more sensors 50 may be allocated to each furnace. The processor 60 may be capable of processing the sensor signals from all of the sensors using the techniques previously discussed and generating an aggregate monitoring signal from the processor. One or more controllers may generate a control signal corresponding to the desired adjustment of the controllable dampers 90. Various configurations of exhaust ducts 41, controllers 70, processors 60 and controllable dampers 90 may be employed.

In another alternative, the damper control system 10 may have a furnace 18 having at least one opening through which electromagnetic radiation from within the furnace may be sensed, an exhaust duct 41 adapted to receive an exhaust gas stream emerging from the furnace, and a controllable damper 90 adapted to adjust the pressure in the exhaust duct. The damper control system may also have a sensor 50 adapted to sense electromagnetic radiation emitted through one or more of the openings of the furnace and generate a sensor signal corresponding to the emitted electromagnetic radiation indicative of furnace emissions, and a controller 70 adapted to control the damper responsive to the monitoring signal indicative of the furnace emissions. The controller 70 may control the damper either directly or indirectly in response to the sensor signal. For example, the sensor signal 51 may be processed prior to being communicated to the controller and/or various signal conditioning techniques may be applied to the sensor signal before receipt by the controller. Additionally, the controller may be responsive to more than one sensor signal in parallel or series. In another embodiment, the damper control system 10 may also include a pressure sensor adapted to generate a pressure monitoring signal, and the controller may be adapted to generate a control signal corresponding to a desired adjustment of the damper responsive to the sensor signal and the pressure monitoring signal.

Various combinations of the elements of the electric arc furnace damper control system previously described may be utilized in a given embodiment. For example, the sensor and processor may be combined. Such integrated sensors with various processing capabilities such as image processing are well known in the art. Additionally, the processor and controller may be combined. Numerous general purpose computers with commercially available peripheral equipment could act as a combined processor and controller. These and other possible combinations are contemplated. It should be apparent that in these combinations, the monitoring signal may be wholly contained within the integrated device, and may even be exclusively contained within a software application.

Also disclosed is a method of controlling a furnace damper.

The method of controlling a furnace damper may include sensing electromagnetic radiation through one or more openings of a furnace and generating a sensor signal corresponding to the electromagnetic radiation, processing the sensor signal and generating a monitoring signal responsive to a parameter of the electromagnetic radiation indicative of furnace emissions, and controlling the damper responsive to the monitoring signal indicative the furnace emissions. The monitoring signal may also be generated responsive to a parameter of the electromagnetic radiation indicative of the pressure in the furnace, and the damper may be controlled responsive to the monitoring signal indicative of the pressure in the furnace.

Alternately, the method of controlling a furnace damper may include sensing electromagnetic radiation from a furnace through one or more openings of the furnace and generating digital images thereof, processing the digital images and generating a monitoring signal responsive to a parameter of the digital images indicative of furnace emissions, and controlling the damper responsive to the monitoring signal indicative of the furnace emissions. Additionally, the step of processing the digital images may also include generating the monitoring signal responsive to a parameter of the digital images indicative of the pressure in the furnace. The step of controlling the damper may also include controlling the damper responsive to the monitoring signal indicative of pressure in the furnace.

The monitoring and control signals may be generated using any of the techniques previously discussed. The method of controlling a furnace damper may also include processing the pixels of the digital image. Adjusting the position of the controllable damper in response to the control signal may be achieved using an actuator as described above. Additionally, all of the features of the furnace damper control system previously discussed are contemplate for use with the method of controlling a furnace damper.

The damper control system components may also be integrated. An integrated damper control system may comprise a controllable damper 90 and a damper control device. The damper control device may comprise a sensor 50 capable of sensing electromagnetic radiation emitted through one or more of the openings of a steelmaking furnace and generating a sensor signal 51 corresponding to the emitted electromagnetic radiation, a processor 60 capable of processing the sensor signal and generating a monitoring signal 61 responsive to a parameter of the electromagnetic radiation indicative of operating conditions within a furnace, and a controller 70 capable of controlling the damper 90 responsive to the monitoring signal indicative of the monitored parameter of furnace operations.

The components of the furnace damper control system may be integrated or packaged into a unit. The integrated device may contain the capabilities of the sensor, image processor, and controller previously discussed. By integrating these elements into a damper control device, interconnections between the sensor and image processor and between the image processor and controller may be reduced or eliminated. For example, the sensor and the image processor may share a common memory thereby eliminating the need for the captured image to be externally communicated to the processor. The image processor may receive the captured image simply by accessing the common memory. Similarly, the image processor and controller may share a common memory where the monitoring signal is stored. In such an embodiment, the monitoring signal may be the value of a memory location rather than a conventional signal transmitted over a wired or wireless connection.

The integrated electric arc furnace damper control device may also contain an output port, not shown, where the control signal may be accessed. An actuator may be connected to the output port to access the control signal. The control signal may be presented at the output port using a custom signal interface or any of the interfaces commonly available on electronic devices, such as RS232 or USB.

As disclosed herein, a furnace system may comprise a converter capable of containing molten metal, an exhaust duct capable of receiving an exhaust gas stream emerging from the furnace, a negative pressure apparatus (e.g. an induced draft fan) capable of drawing the exhaust gas stream from the furnace through the exhaust duct, a controllable damper capable of adjusting the pressure in the exhaust duct, at least one opening through which electromagnetic radiation from combustion in the furnace may be sensed, a sensor capable of sensing electromagnetic radiation emitted through one or more openings of the electric arc furnace and generating digital images thereof, a processor capable of processing the digital images and generating a monitoring signal responsive to a parameter of the digital images indicative of furnace emissions, a controller capable of generating a control signal responsive to the monitoring signal indicative of the furnace emissions. The monitoring signal may also be responsive to a parameter of the digital images indicative of the pressure in the furnace, and the controller may be cable of generating a control signal responsive to the monitoring signal indicative of the pressure in the furnace. Additionally, the furnace system may include an actuator capable of adjusting the position of the damper in response to the control signal. Further, the features of the furnace damper control system 10 previously discussed are contemplated for use with the furnace system.

Also disclosed is a method of making steel comprising charging a furnace with raw material and operating the furnace to melt the raw material and make steel. The raw material charge may be scrap metal and the furnace may be an electric arc furnace. The operation of an electric arc furnace may employ electrodes, oxygen lances, and other appropriate features such as discussed in U.S. Pat. No. 6,584,137. The method of making steel also comprises sensing electromagnetic radiation emitted from the furnace through one or more openings of the electric arc furnace. As previously discussed the openings of the electric arc furnace may include the furnace-roof opening 22, the electrode opening 32, and the exhaust port opening 42, as illustrated in FIG. 1. The method also comprises generating a sensor signal corresponding to the sensed electromagnetic radiation. In one example, the sensor signal comprises digital images. The method of making steel also includes processing the sensor signal and generating a monitoring signal responsive to a parameter of the electromagnetic radiation indicative of furnace emissions, or the pressure or temperature in the furnace. In one embodiment, the method also comprises processing the pixels of a digital image, and generating a monitoring signal corresponding to a parameter of pixels in the digital image. The method also includes controlling the damper responsive to the monitoring signal indicative of furnace emissions, or the pressure in the furnace. Additionally, the method may include generating a control signal corresponding to a desired adjustment of a controllable damper indicated by the monitoring signal, and adjusting the position of the controllable damper in response to the control signal.

The method of making steel may also include comparing the intensity of the pixels of the captured digital images to a reference intensity of the electromagnetic radiation, and segmenting the captured image into selected control zones where each control zone is a portion of the capture image. The method of making steel may be implemented using a separate sensor, image processor, and controller as previously discussed, or combinations of these elements. Alternatively, the method of making steel may be implemented using an integrated furnace damper control device.

The furnace damper control system and methods presently described may also be combined with other monitoring and control techniques. For example, certain steps in the operation of a furnace may use predetermined damper settings.

When charging the furnace with raw material, the damper may be set to provide increased flow through the exhaust duct such as Reference B in FIG. 5B as a surge of furnace emissions may be produced when the raw materials are first introduced into a heated furnace. Other steps such as tapping or trimming may similarly warrant a predetermined setting for the damper such as Reference C in FIG. 5B. A system that permits switching between automated damper control and predetermined or manual setting may thus be useful for many installations. Additionally, combining the automated optical damper control system with pressure monitoring, temperature monitoring, or exhaust gas composition monitoring may provide additional information on the operation of the electric arc furnace and allow for improvements in controlling furnace emissions.

The monitoring signal 61 and control signal 71 may be any type of signal suitable for use in an industrial environment. The processor 60, controller 70, and actuator 80 selected for any given implementation will determine the necessary signal characteristics. It is contemplated that the signals may be wired or wireless, and analog or digital. To minimize interference, however, wired digital signals may be desired.

Additionally, the damper control system may include various alarms to alert the operator of potential fault conditions. In one example, an alarm may be triggered by the failure of the sensor to capture an image, or upon an analysis of the captured image. An alarm may be provided by the monitoring signal exceeding predetermined limits, by the control signal exceeding pre-established limits, or by the control signal continuously attempting to fully open or fully close the controllable dampers for more than a predetermined time period. These and other error conditions will be apparent to those of skill in the art and may be integrated with the damper control system to provide increased protection for the operators of the furnace and the damper control system.

The automated damper control system presently disclosed may also comprise various alarm signals to alert an operator of conditions warranting attention. For example, during normal operations the monitoring signal may be expected to fluctuate within a predetermined range and to respond to damper control adjustments within a certain time period. If the monitoring signal exceeds the predetermined range for more than an expected time period, an alarm signal may be generated to alert the operator to the unexpected behavior. Similarly, if the control signal exceeds predetermined limits over a specified time period, this may indicate a fault condition and warrant generating an alarm signal to alert the operator of a potential problem. Alternately or in addition, the pressure in the exhaust duct 41 may be monitored. Additional safety measures, such as temperature monitors on the controllable dampers, may be utilized in combination with the automated damper control system. Alarm signals may be provided responsive to the monitored pressure, temperature, and/or other parameters, such as gas constituents or particulate matter levels in the exhaust duct, or responsive to changes in these parameters. These and other conditions will be apparent to those of skill in the art. Such additional measures may also provide additional information useful for optimizing the performance of the damper control system and for detecting potential problems.

The automated damper control system may be implemented with various types of software including commercially available products such as National Instruments Lab View®. The software implementation may provide the capability for an operator to override the automatic operation and manually control the position of the dampers as may be desired. Such implementations are contemplated and may be useful for calibrating system parameters to achieve optimal efficiency.

While the invention has been described with detailed reference to one or more embodiments, the disclosure is to be considered as illustrative and not restrictive. Modifications and alterations will occur to those skilled in the art upon a reading and understanding of this specification. It is intended to include all such modifications and alterations in so far as they come within the scope of the claims, or the equivalents thereof.

What is claimed is:

1. A method of controlling a furnace damper, the method comprising:
   a) sensing electromagnetic radiation emitted through one or more openings of a furnace and generating a sensor signal corresponding to the emitted electromagnetic radiation;
   b) processing the sensor signal and generating a monitoring signal responsive to a parameter of the electromagnetic radiation indicative of furnace emissions; and
   c) controlling the damper responsive to the monitoring signal indicative of the furnace emissions.

2. The method of controlling a furnace damper of claim 1, where the electromagnetic radiation is at least a part of the visible spectrum.

3. The method of controlling a furnace damper of claim 1, where the step of processing the sensor signal comprises: generating a monitoring signal responsive to a parameter of the electromagnetic radiation selected from the group consisting of intensity, wavelength, amplitude, frequency, and combinations thereof.

4. The method of controlling a furnace damper of claim 1, further comprising the step of: monitoring pressure and generating a pressure monitoring signal.

5. The method of controlling a furnace damper of claim 4, further comprising the step of: generating a control signal corresponding to a desired adjustment of the damper responsive to the monitoring signal and the pressure monitoring signal.

6. The method of claim 1, further comprising:
   charging a furnace with raw material; and
   operating the furnace to melt the raw material and make steel.

7. The method of claim 1, wherein sensing electromagnetic radiation emitted through one or more openings of a furnace comprises using one or more sensors.

8. The method of claim 1, wherein the one or more openings of the furnace comprise one or more openings of multiple furnaces.

9. A method of controlling a furnace damper, the method comprising:
   a) sensing electromagnetic radiation emitted through one or more openings of a furnace and generating digital images thereof;
   b) processing the digital images and generating a monitoring signal responsive to a parameter of the digital images indicative of furnace emissions; and
   c) controlling the damper responsive to the monitoring signal indicative of the furnace emissions.

10. The method of controlling a furnace damper of claim 9 where the digital images are selected from the group consisting of monochrome images, multi-color images, and infrared images.

11. The method of controlling a furnace damper of claim 9, the step of processing the digital images comprising: comparing the intensity of pixels of the digital images to a reference intensity.

12. The method of controlling a furnace damper of claim 11, where the reference intensity is a predetermined value.

13. The method of controlling a furnace damper of claim 11, where the reference intensity is an adjustable value.

14. The method of controlling a furnace damper of claim 11, where the monitoring signal corresponds to a ratio of pixels of the digital images exceeding the reference intensity.

15. The method of controlling a furnace damper of claim 11, where the parameter of the digital images is the number of pixels of the digital images having an intensity exceeding the reference intensity.

16. The method of controlling a furnace damper of claim 9, the step of processing the digital images comprising: analyzing the color of pixels of the digital images.

17. The method of controlling a furnace damper of claim 9, further comprising: generating the monitoring signal responsive to at least two parameters of pixels of the digital images.

18. The method of controlling a furnace damper of claim 9, further comprising: segmenting the digital images into selected control zones, where each control zone is a portion of the digital images.

19. The method of controlling a furnace damper of claim 18, where the control zones are predetermined portions of the digital images.

20. The method of controlling a furnace damper of claim 18, further comprising the step of: determining by the processor the control zones of the digital images.

21. The method of controlling a furnace damper of claim 18, further comprising the step of: separately processing pixels of the digital images in each control zone.

22. The of controlling a furnace damper of claim 18, further comprising: generating at least two monitoring signals corresponding to at least two control zones.

23. The method of controlling a furnace damper of claim 9, the step of controlling the damper comprising: generating a control signal corresponding to a desired adjustment of the controllable damper responsive to the monitoring signal.

24. The method of controlling a furnace damper of claim 23, further comprising: generating at least two control signals corresponding to desired adjustments of at least two dampers.

25. The method of controlling a furnace damper of claim 9, further comprising the step of: comparing the monitoring signal to a set-point.

26. The method of claim 9, wherein sensing electromagnetic radiation emitted through one or more openings of a furnace comprises using one or more sensors.

27. The method of claim 9, wherein the one or more openings of the furnace comprise one or more openings of multiple furnaces.

\* \* \* \* \*